United States Patent
Wang et al.

(10) Patent No.: US 7,554,328 B2
(45) Date of Patent: Jun. 30, 2009

(54) METHOD AND APPARATUS FOR REDUCING BOREHOLE AND ECCENTRICITY EFFECTS IN MULTICOMPONENT INDUCTION LOGGING

(75) Inventors: Tsili Wang, Katy, TX (US); Alexandre N. Bespalov, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 325 days.

(21) Appl. No.: 11/598,305

(22) Filed: Nov. 13, 2006

(65) Prior Publication Data

US 2008/0111554 A1    May 15, 2008

(51) Int. Cl.
    *G01V 3/18*    (2006.01)
(52) U.S. Cl. .................... 324/343; 324/339
(58) Field of Classification Search .......... 324/333–343
    See application file for complete search history.

(56) References Cited

U.S. PATENT DOCUMENTS

| | | | | |
|---|---|---|---|---|
| 4,302,722 A | | 11/1981 | Gianzero | 324/339 |
| 4,651,101 A | * | 3/1987 | Barber et al. | 324/339 |
| 4,837,517 A | | 6/1989 | Barber | 324/339 |
| 5,157,605 A | | 10/1992 | Chandler et al. | 364/422 |
| 5,600,246 A | | 2/1997 | Forgang et al. | 324/339 |
| 6,470,274 B1 | | 10/2002 | Mullison et al. | 702/7 |
| 6,502,036 B2 | | 12/2002 | Zhang et al. | |
| 6,636,045 B2 | | 10/2003 | Tabarovsky et al. | 324/343 |
| 6,643,589 B2 | | 11/2003 | Zhang et al. | 702/7 |
| 6,693,430 B2 | | 2/2004 | Rosthal et al. | 324/338 |
| 6,836,218 B2 | * | 12/2004 | Frey et al. | 340/854.6 |
| 2003/0141872 A1 | | 7/2003 | Clark et al. | |
| 2005/0083064 A1 | | 4/2005 | Homan et al. | |
| 2005/0083161 A1 | | 4/2005 | Minerbo et al. | |
| 2008/0224707 A1 | * | 9/2008 | Wisler et al. | 324/338 |

OTHER PUBLICATIONS

J.H. Moran et al.; *Basic Theory of Induction Logging and Application to Study of Two-Coil Sondes*, Geophysics, vol. 27, No. 6, Part 1, Dec. 1962, Society of Exploration Geophysicists, pp. 829-858, 26 Figs.

* cited by examiner

*Primary Examiner*—Jay M Patidar
(74) *Attorney, Agent, or Firm*—Madan & Sriram, P.C.

(57) ABSTRACT

An apparatus, method and computer-readable medium for evaluating an earth formation. A logging tool having a non-conductive mandrel and a conducting sleeve having at least one antenna that are electrically connected is conveyed into a borehole in the earth formation. At least one of the antennae has a coil oriented at a non-zero an angle to a longitudinal axis of the logging tool. The at least one antenna is activated, and an effect of a signal received by a receiver coil on the logging tool due to at least one of (A) an eccentering of the logging tool, and (B) a coil misalignment is reduced.

16 Claims, 6 Drawing Sheets

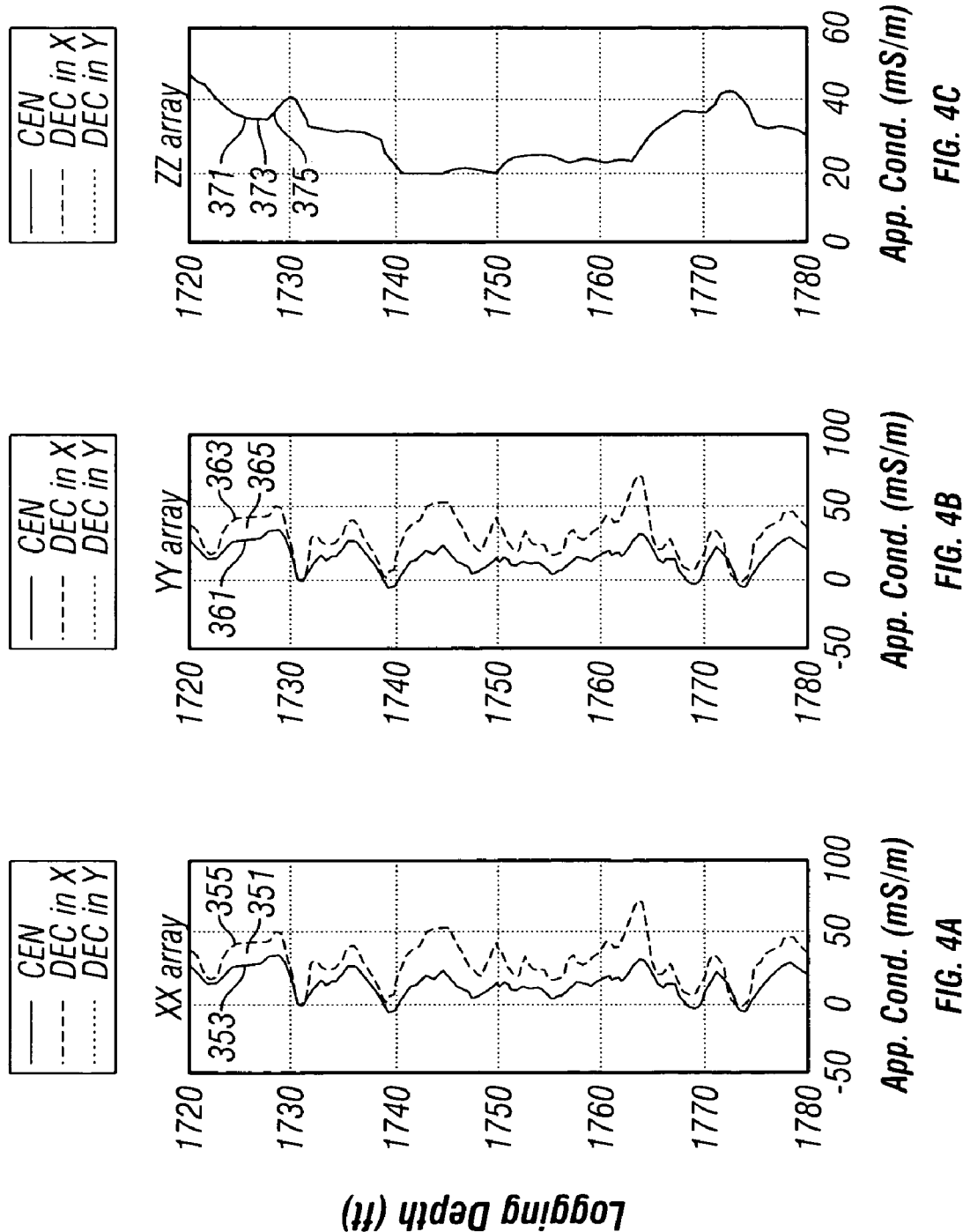

METHOD AND APPARATUS FOR REDUCING BOREHOLE AND ECCENTRICITY EFFECTS IN MULTICOMPONENT INDUCTION LOGGING

BACKGROUND OF THE INVENTION

1. Field of the Invention

The invention is related generally to the use of multi-component resistivity measurements for determination of properties of earth formations. In particular, the present invention discusses a method of reducing the non-formation induction effects in multi-component resistivity measurements.

2. Background of the Art

Electromagnetic induction resistivity well logging instruments are well known in the art. Electromagnetic induction resistivity well logging instruments are used to determine the electrical conductivity, and its converse, resistivity, of earth formations penetrated by a borehole. Formation conductivity has been determined based on results of measuring the magnetic field of eddy currents that the instrument induces in the formation adjoining the borehole. The electrical conductivity is used for, among other reasons, inferring the fluid content of the earth formations. Typically, lower conductivity (higher resistivity) is associated with hydrocarbon-bearing earth formations. The physical principles of electromagnetic induction well logging are well described, for example, in, J. H. Moran and K. S. Kunz, *Basic Theory of Induction Logging and Application to Study of Two-Coil Sondes*, Geophysics, vol. 27, No. 6, part 1, pp. 829-858, Society of Exploration Geophysicists, December 1962. Many improvements and modifications to electromagnetic induction resistivity instruments described in the Moran and Kunz reference, supra, have been devised, some of which are described, for example, in U.S. Pat. No. 4,837,517 to Barber, in U.S. Pat. No. 5,157,605 to Chandler et al., and in U.S. Pat. No. 5,600,246 to Fanini et al.

Conventional induction well logging techniques employ a metal pipe inside a coil mandrel. One or more transmitter coils are energized by an alternating current. The oscillating magnetic field produced by this arrangement results in the induction of currents in the formations which are nearly proportional to the conductivity of the formations. These currents, in turn, contribute to the voltage induced in one or more receiver coils. By selecting only the voltage component which is in phase with the transmitter current, a signal is obtained that is approximately proportional to the formation conductivity. In a conventional induction logging apparatus, the basic transmitter coil and receiver coil have axes which are aligned with the longitudinal axis of the well logging device. (For simplicity of explanation, it will be assumed that the borehole axis is aligned with the axis of the logging device, and that these are both in the vertical direction. Also single coils will subsequently be referred to without regard for focusing coils or the like.) This arrangement tends to induce secondary current loops in the formations that are concentric with the vertically oriented transmitting and receiving coils. The resultant conductivity measurements are indicative of the horizontal conductivity (or resistivity) of the surrounding formations. There are, however, various formations encountered in well logging which have a conductivity that is anisotropic. Anisotropy results from the manner in which formation beds were deposited by nature. For example, "uniaxial anisotropy" is characterized by a difference between the horizontal conductivity, in a plane parallel to the bedding plane, and the vertical conductivity, in a direction that is commonly perpendicular to the bedding plane. When there is no bedding dip, horizontal resistivity can be considered to be in the plane perpendicular to the borehole, and the vertical resistivity in the direction parallel to the borehole. Conventional induction logging devices, which tend to be sensitive only to the horizontal conductivity of the formations, do not provide a measure of vertical conductivity or of anisotropy. Techniques have been developed to determine formation anisotropy. See, e.g. U.S. Pat. No. 4,302,722 to Gianzero et al. Transverse anisotropy often occurs such that variations in resistivity occur in the azimuthal direction.

Multi-component signals can be used for interpreting formation resistivities and petrophysical parameters. The principles used for this interpretation have been discussed, for example, in U.S. Pat. No. 6,470,274 to Mollison et al, U.S. Pat. No. 6,643,589 to Zhang et al., U.S. Pat. No. 6,636,045 to Tabarovsky et al., the contents of which are incorporated herein by reference. Specifically, the parameters estimated may include horizontal and vertical resistivities (or conductivities), relative dip angles, strike angles, sand and shale content and water saturation. In addition, U.S. patent application Ser. No. 11/125,530 of Rabinovich et al. teaches the use of multi-component measurements for analysis of fractured earth formations that may also have anisotropic layers. These multi-component signals are typically obtained using a multi-component measurement tool having coils oriented transverse to the tool axis in addition to coils oriented parallel to the tool axis.

In addition to formation response, resistivity measurements can be affected by magnetic fields that arise from non-formation effects. Two such non-formation effects result from tool eccentricity within the borehole and coil misalignment with respect to the tool axis. Induction tools generally give rise to a current flow in the conductive drilling mud that surrounds the tool and fills the borehole. Tool eccentricity generally causes more problems to transverse (X or Y) coils than to axial (Z) coils. FIGS. 3A-C show cross-sectional views of an induction tool having a non-conductive mandrel at different positions within a borehole. FIG. 3A shows an x-oriented tool 304 that is centered within the borehole 302 filled with mud 306. In one aspect, the current induced in the borehole generally flows along the axial channel 307 and in the opposite direction along the axial channel 309. Due to the symmetry of the current flow channels (307 and 309), the centered induction tool does not experience an eccentricity effect. In FIG. 3B, the tool is decentralized along the x-direction. Due to the orientation of the transmitter, the current flowing along channels 307 and 309 still displays symmetry and thus this eccentricity generally does not affect the measurements much. FIG. 3C shows the induction tool decentralized along the y-axis, such that channel 307 is constricted while the lower channel is broadened 309. Additionally, current flowing in channel 307 may interact with the formation. Thus, the borehole current flow is highly affected due to decentralization along the y-axis. The net borehole current induces signals in transverse receiver coils, especially coplanar transmission and receiver coils. The net current may also induce signals in axial receiver coils that are at different axial positions from the transverse transmitter coil. Because the induction current density increases with increasing mud conductivity, the net current-induced signals are stronger for higher mud conductivity.

The eccentricity effects may be reduced by using a conductive mandrel. However, such a conductive mandrel is highly susceptible to the effects of coil misalignment. The coil misalignment effect is due to the position of coils with respect to the tool axis or inner pipe. Induction tool coils are typically disposed on a pipe which may be of a highly conductive metal. The pipe serves several purposes, such as protecting and shielding through-wires and supporting the tool weight. A transverse transmitter coil induces an induction current in the pipe if the pipe forms a closed loop with other paths of electric current. However, the pipe current does not necessarily distort the tool measurement. If the receiver coil, coplanar with the transmitter coil, is symmetric with respect to the pipe axis, the measurement is typically not affected. The pipe induction current affects the measurement only if the receiver coil also is asymmetric with respect to the pipe axis. An orthogonal transverse receiver coil may also be affected by coil misalignment. In addition to the coil misalignment error caused by the pipe eddy current, misaligned orthogonal coils will also induce direct coupling between the coils.

In the existing processing software, the borehole fluid, tool eccentricity effects, and other near-borehole effects are removed or suppressed by using a multi-frequency focusing technique. The disadvantage of this processing is that it removes much of the high spatial frequency content in the data and thus lowers the vertical resolution.

U.S. Pat. No. 6,693,430 to Rosthal et al. discusses making subsurface measurement with reduced borehole effects. Antenna and electrode configurations address the undesired axial electric currents that are induced along the borehole. Current and measure electrodes are used in combination with antennas to limit the flow of undesired axial borehole currents. Embodiments use passive, active, or semi-active electrodes to limit the undesired current flow.

U.S. patent application Ser. No. 10/711,309, by Minerbo et al. discusses an induction tool including a conductive mandrel; at least one array including a transmitter, a bucking coil, and a receiver disposed in an insulating tool body surrounding the conductive mandrel. An electrode is disposed on the insulating tool body at a selected location between the bucking coil and the receiver, wherein the selected location is spaced from the transmitter at a distance corresponding approximately to the harmonic mean of the distance between the transmitter and the receiver, and wherein the electrode includes a contact forming a conductive path to the conductive mandrel. Additional electrodes may be disposed above and below each transmitter and receiver coil to reduce sensitivity to eccentricity of the tool in the borehole.

Obtaining accurate transverse coil measurements depends on reducing non-formation effects such as borehole effects and coil misalignment. There is a need for a housing design that reduces non-formation effects in multi-component induction measurements. The disclosed invention reduces these effects.

SUMMARY OF THE INVENTION

One embodiment of the invention is an apparatus for evaluating an earth formation. The apparatus includes a logging tool including a non-conducting member having a conductive outer sleeve provided with a plurality of openings. At least one antenna is associated with each of the openings, at least one of the antennas having a coil oriented at an angle to a longitudinal axis of the non-conducting member. A central conducting member includes wires the electrically connect at least one of the antennas to another of the antennas. The outer sleeve may include a plurality of electrically coupled shells. The apparatus may further include a processor configured to analyze data resulting from activation of at least one transmitter antenna with the logging tool disposed in a borehole in the earth formation.

Another embodiment of the invention is a method of evaluating in the formation. A logging tool is conveyed into a borehole in the third formation. At least one antenna having a coil oriented at an angle to a market to a longitudinal axis of the logging is activated. To reduce an effect on a signal received by a receiver coil on the logging tool due to eccentering of the tool and/or coil misalignment, the logging tool is provided with the nonconducting mandrel and a conducting sleeve.

Another embodiment of the invention is a computer readable medium for use within apparatus for evaluating and formation. The apparatus includes a logging tool having in nonconducting member and a conducting outer sleeve provided with a plurality of openings. The apparatus also includes at least one antenna associated with each of the openings at least one of the antennas having a coil oriented at an angle to an longitudinal axis of the nonconducting member. The apparatus further includes a central conducting member including wires that electrically connect at least one of the plurality of antennas to another of the plurality of antennas. The medium includes instructions which enables a processor to determine from a signal resulting from activation of the least one antenna a property of the earth formation The property may be a vertical resistivity, a horizontal resistivity, a sand fraction, a water saturation, a formation dip and/or an azimuth.

BRIEF DESCRIPTION OF THE FIGURES

The present invention is best understood with reference to the following figures in which like numbers refer to like components and in which:

FIGS. 4a, 4b and 4c shows field measurements of different components made with a centered and eccentered tool;

DETAILED DESCRIPTION OF THE INVENTION

Figure 1:
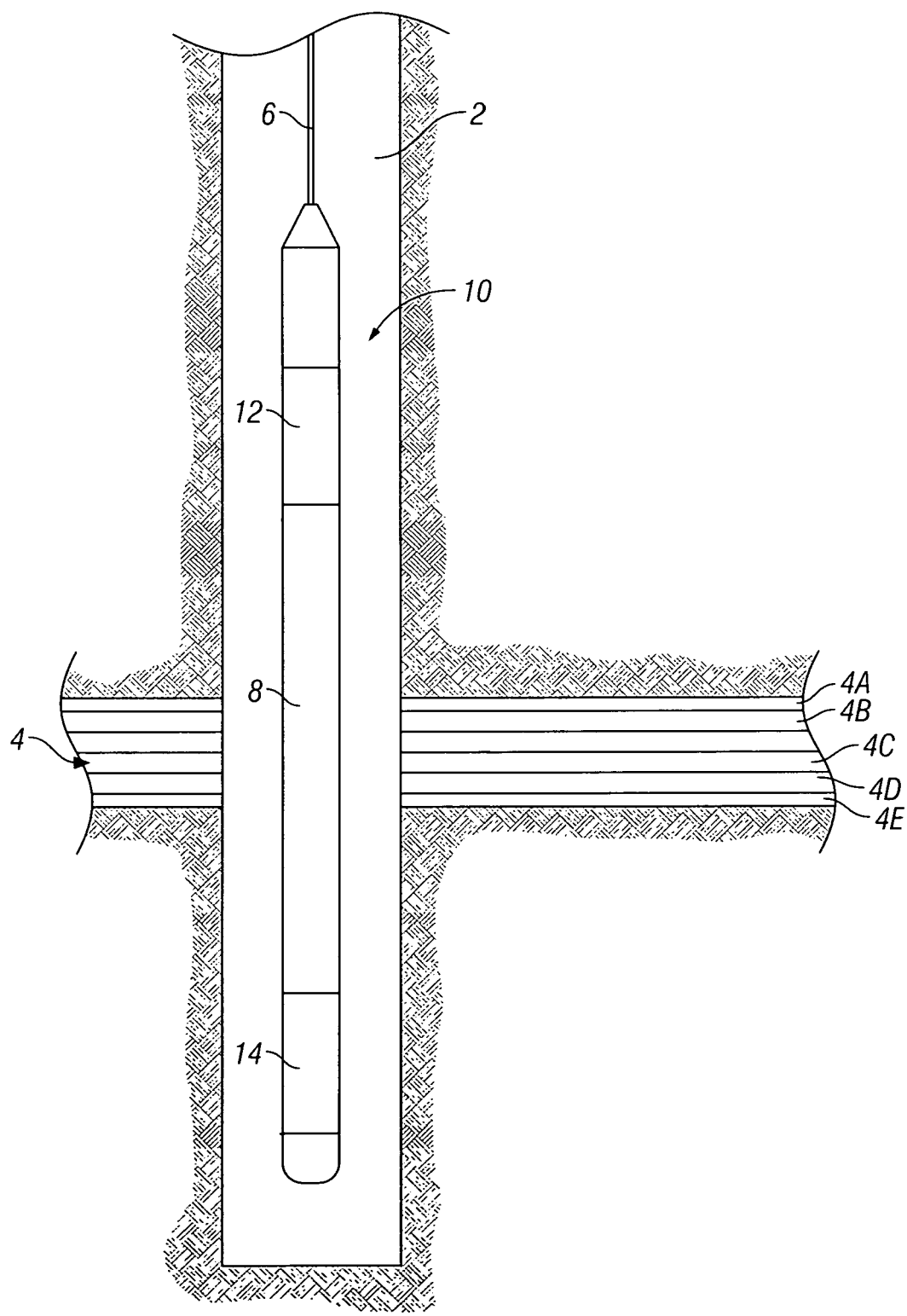
FIG. 1 (Prior Art) illustrates an induction instrument disposed in a borehole penetrating an earth formation.

Referring now to FIG. 1, an electromagnetic induction well logging instrument 10 is shown disposed in a wellbore 2 drilled through earth formations. The earth formations are shown generally at 4. The instrument 10 can be lowered into and withdrawn from the wellbore 2 by use of an armored electrical cable 6 or similar conveyance known in the art. The instrument 10 can be assembled from three subsections: an auxiliary electronics unit 14 disposed at one end of the instrument 10; a coil mandrel unit 8 attached to the auxiliary electronics unit 14; and a receiver/signal processing/telemetry electronics unit 12 attached to the other end of the coil mandrel unit 8, this unit 12 typically being attached to the cable 6.

The coil mandrel unit 8 includes induction transmitter and receiver coils, as will be further explained, for inducing electromagnetic fields in the earth formations 4 and for receiving voltage signals induced by eddy currents flowing in the earth formations 4 as a result of the electromagnetic fields induced therein.

The auxiliary electronics unit 14 can include a signal generator and power amplifiers (not shown) to cause alternating currents of selected frequencies to flow through transmitter coils in the coil mandrel unit 8. A processor which controls the operation of the tool and processing acquired data may be part of the electronics unit. Alternatively, some or all of the processing and control may be done by a surface processor.

The receiver/signal processing/telemetry electronics unit 12 can include receiver circuits (not shown) for detecting voltages induced in receiver coils in the coil mandrel unit 8, and circuits for processing these received voltages (not shown) into signals representative of the conductivities of various layers, shown as 4A through 4F of the earth formations 4. As a matter of convenience the receiver/signal processing/telemetry electronics unit 12 can include signal telemetry to transmit the conductivity-related signals to the earth's surface along the cable 6 for further processing, or alternatively can store the conductivity related signals in an appropriate recording device (not shown) for processing after the instrument 10 is withdrawn from the wellbore 2.

Figure 2:
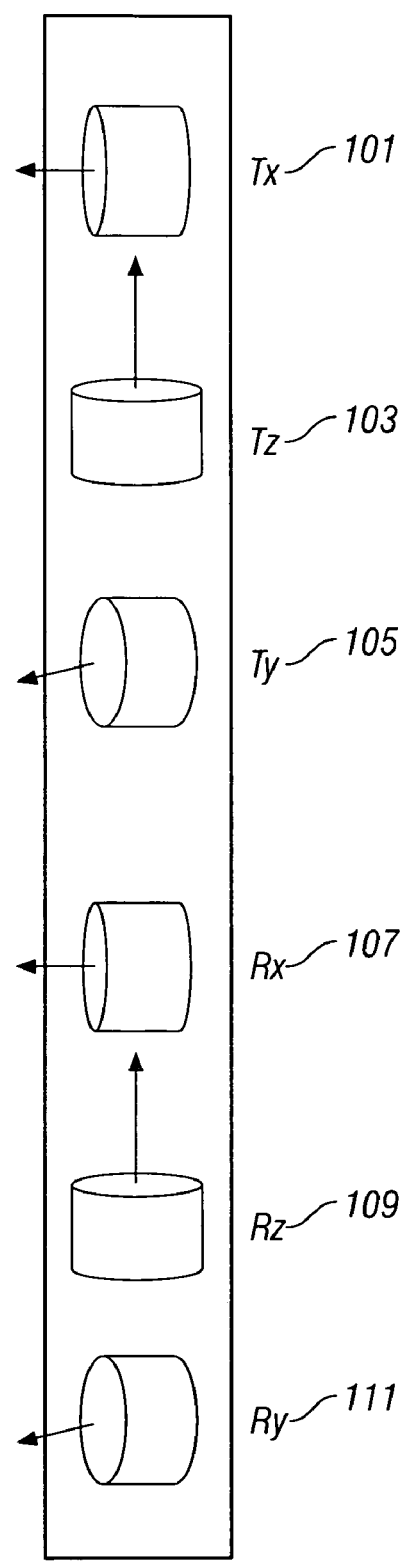
FIG. 2 (Prior Art) illustrates the arrangement of transmitter and receiver coils in a multi-component induction logging tool marketed under the name 3DExplorer™.

Referring to FIG. 2, the configuration of transmitter and receiver coils in the 3DEX™ multi-component induction logging instrument of Baker Hughes is shown. This is for exemplary purposes only, and any multi-component tool may be used. Three orthogonal transmitters 101, 103 and 105 that are referred to as the $T_x$, $T_z$, and $T_y$ transmitters are shown (the z-axis is the longitudinal axis of the tool). Corresponding to the transmitters 101, 103 and 105 are associated receivers 107, 109 and 111, referred to as the $R_x$, $R_z$, and $R_y$ receivers, for measuring the corresponding magnetic fields. Magnetic fields induced by a transmitter are subsequently recorded at a selected receiver. The magnetic field is generally referred to with indices indicating the orientation of the transmitter used and the orientation of the receiver used. Thus $H_{xy}$, for example, indicates the response of a field generated by the $T_x$ transmitter and subsequently recorded at the $R_y$ receiver. In one mode of operation of the tool, the $H_{xx}$, $H_{yy}$, $H_{zz}$, $H_{xy}$, and $H_{xz}$ components are measured, though other components may also be used. It should be noted that the method of the present invention may also be used with non-orthogonal configurations of transmitters and receivers. Well known coordinate rotation methods may be used with such non-orthogonal measurements to rotate them into the desired orientation. For the purposes of the present invention, all such measurements (orthogonal and non-orthogonal) will be referred to as multi-component measurements FIG. 4 shows measurements of $H_{xx}$, $H_{yy}$, and $H_{zz}$ respectively with a tool such as that shown in FIG. 2 The log 351 in FIG. 4a is for a centered $H_{xx}$ measurement, 353 is for an $H_{xx}$ measurement with the tool displace in the x-direction and 355 is for an $H_{xx}$ measurement with the tool displaced in the y-direction. As would be expected in view of the discussion above, the curves 351 and 353 are virtually identical. Similarly, the $H_{yy}$ measurement with the tool centered 361 is indistinguishable from the $H_{yy}$ measurement 365 with the tool displaced in the y-direction while the $H_{yy}$ measurement with the tool displaced in the x-direction shows the effect of eccentering. The $H_{zz}$ measurements are substantially the same with the centered tool 371 and with the tool displaced in the x-direction 373 and the y-direction 375.

Figure 5:
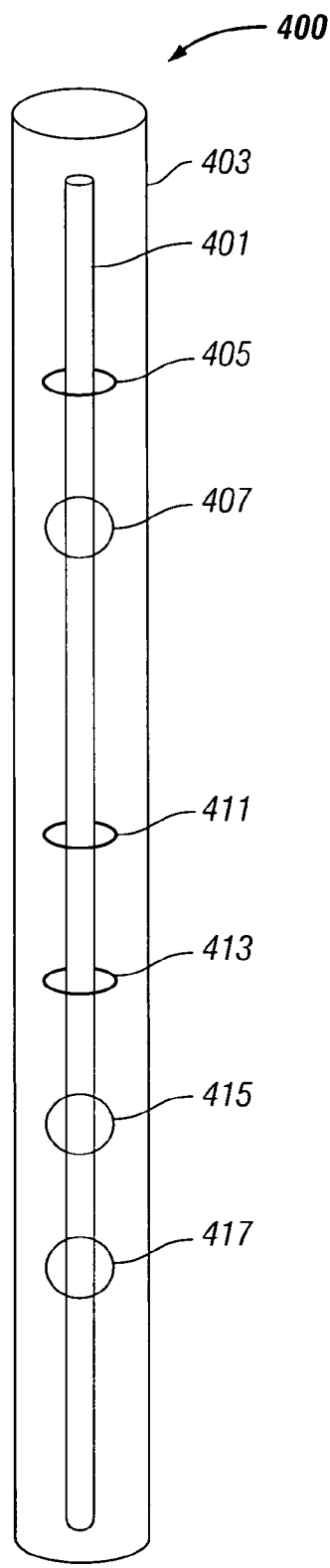
FIG. 5 illustrates an exemplary apparatus that may be used to obtain multi-component resistivity measurements.

FIG. 5 shows an exemplary measurement apparatus 400 that may be used to obtain multi-component resistivity measurements. The exemplary apparatus includes a non-conducting sleeve 403 surrounding a conducting pipe 401. The pipe contains various through-wires used to complete circuits between coils and electric equipment (not shown). The tool 400 may include one or more transmitter coils 405 and 407 aligned in various directions, such as parallel to the longitudinal axis of the device (405) and transverse to the axis of the device (407) and supported by pipe 401. In addition, the tool may include various receiver loops axially displaced from the transmitter coils 405 and 407. In the exemplary apparatus of FIG. 5, two longitudinally oriented receiver coils 411 and 413 are separated from each other along the pipe 401. Additionally, the device includes transverse receiver coils 415 and 417 separated from each other and axially displaced from the transmitter coils. The different positions of the transmitter and receiver coils enable obtaining measurements at different radial depths of investigation as well as over long and short distances. It is understood that the specific design of the induction tool shown in FIG. 5 is not meant as a limitation of the invention but rather is shown to provide an illustrative example of the disclosure. Alternate coil configurations may also be used that include fewer or more coils than are shown in FIG. 5.

Figure 6:
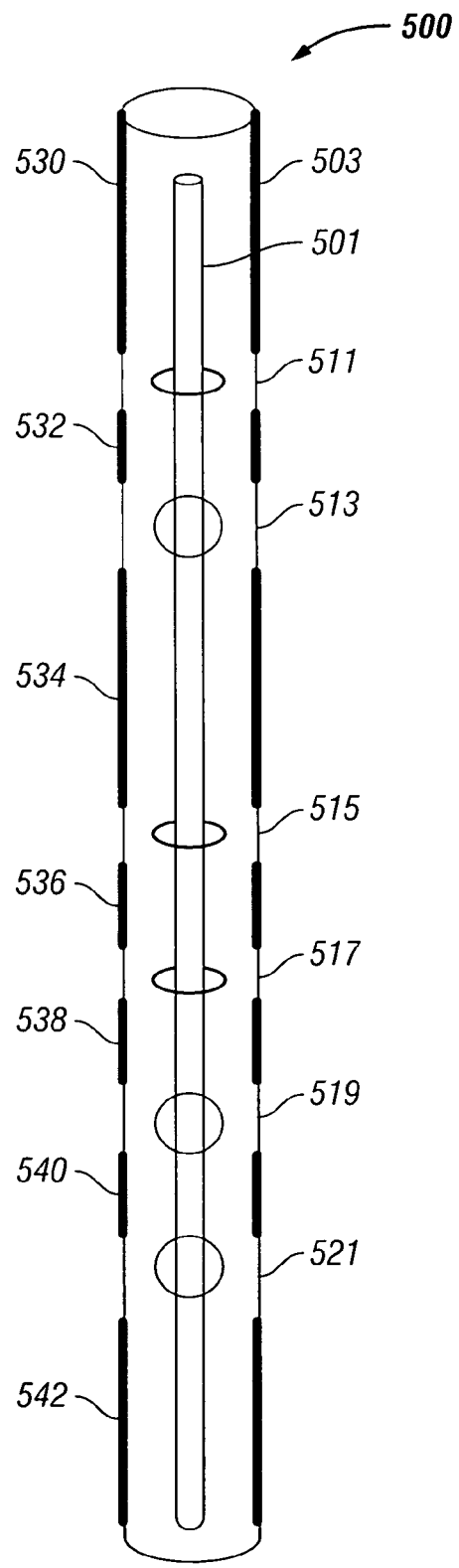
FIG. 6 illustrates an exemplary apparatus of the present disclosure for reducing the non-formation effects on multi-component resistivity measurements.

FIG. 6 shows an exemplary apparatus 500 of the present invention which reduces non-formation effects on multi-component resistivity measurements. The exemplary apparatus includes a non-conducting mandrel 503 surrounding a conductive pipe 501. The mandrel 503 is electrically disconnected from pipe 501 by a non-conductive material so that the pipe does not involve itself in a complete conductive circuit. This reduces error from coil misalignment. The mandrel is provided with a metal sleeve comprising windows 511, 513, 515, 517, 519 and 521 located at the axial positions of the transmitters and of the receivers as shown. The existence of these windows creates or may alternately be described in reference to metal shells 530, 532, 534, 536, 538, 540, and 542. The metal shells may be electrically connected so that current flows over the sleeve without interruption. The electric current in the mud is thereby redistributed over the conductive sleeve of the tool. The current on the sleeve is much more symmetric to the tool axis than that in the mud, which leads to a much smaller tool eccentricity effect. The conductive sleeve is electrically insulated from the inner pipe.

Figure 7:
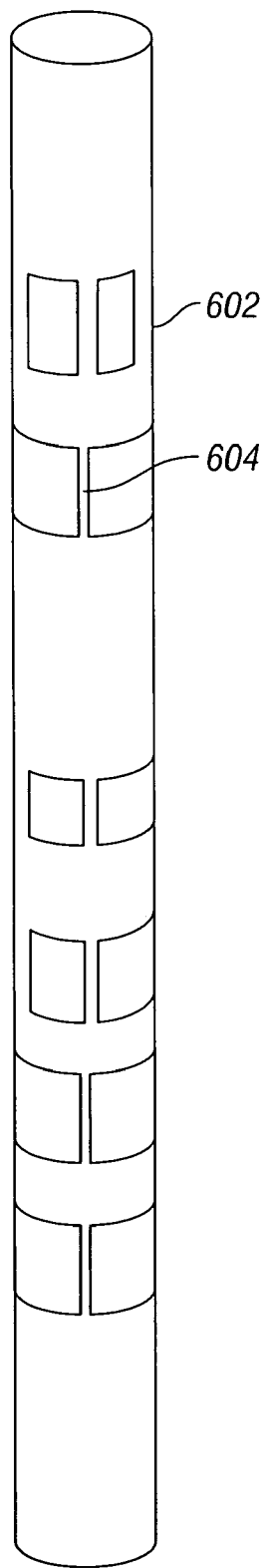
FIG. 7 illustrates an exemplary apparatus of the present disclosure having a slotted conductive sleeve.
Figure 8:
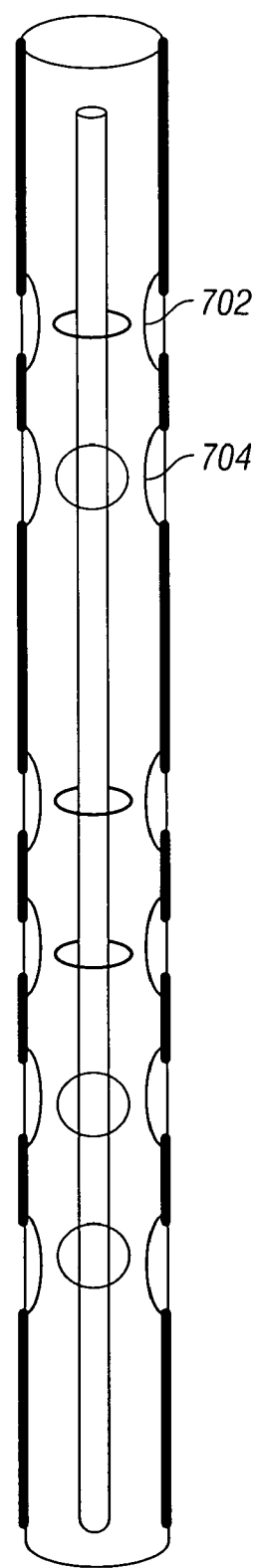
FIG. 8 illustrates an alternate apparatus of the present disclosure in which conductive shells are electrically connected using internal wires.

FIG. 7 shows one aspect of an exemplary apparatus of the present disclosure having a slotted conductive sleeve. For electromagnetic energy to propagate to and from the coils, windows are cut in the sleeve alongside the coils. To enable electrical continuity in the tool axis direction, metal strips such as strips 602 and 604 connect adjacent shells to each other. FIG. 8 shows an alternate aspect of an apparatus of the present disclosure having conductive shells that are electrically connected using internal wires, such as wires 702 and 704. The windows in front of transverse coils preferably do not have connecting metal strips in the proximity and parallel to the coil edges.

Figure 3A:
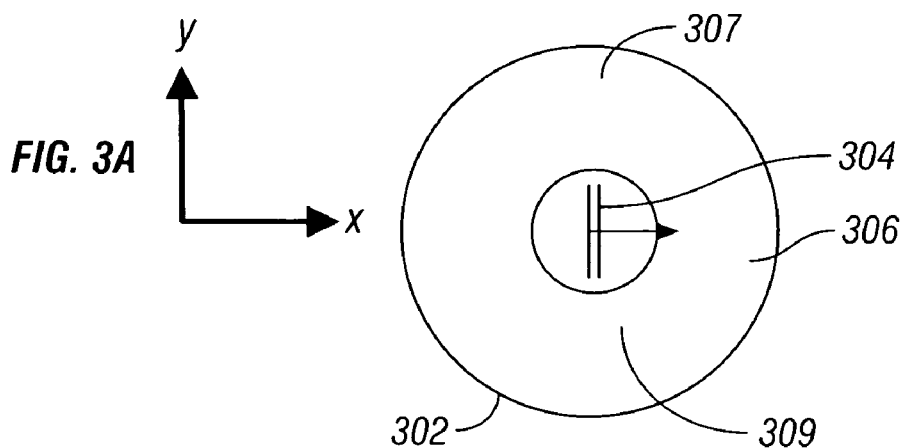
FIGS. 3A-C show a cross-sectional view of an induction tool at different locations within a borehole.
Figure 3B:
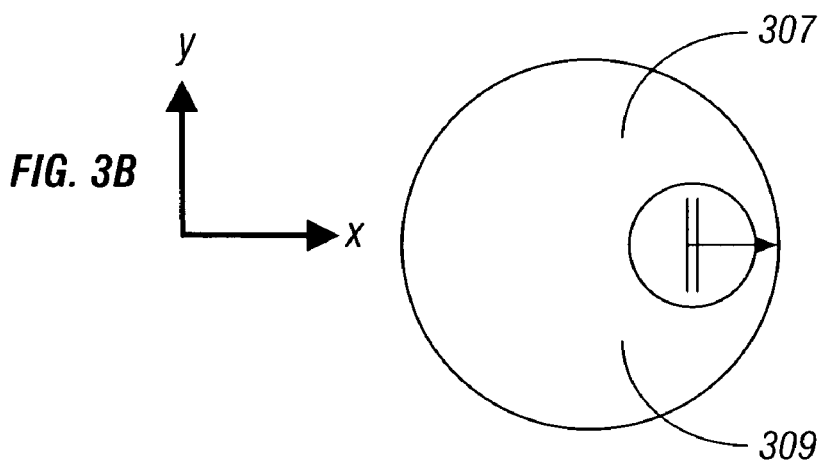
Figure 3C:
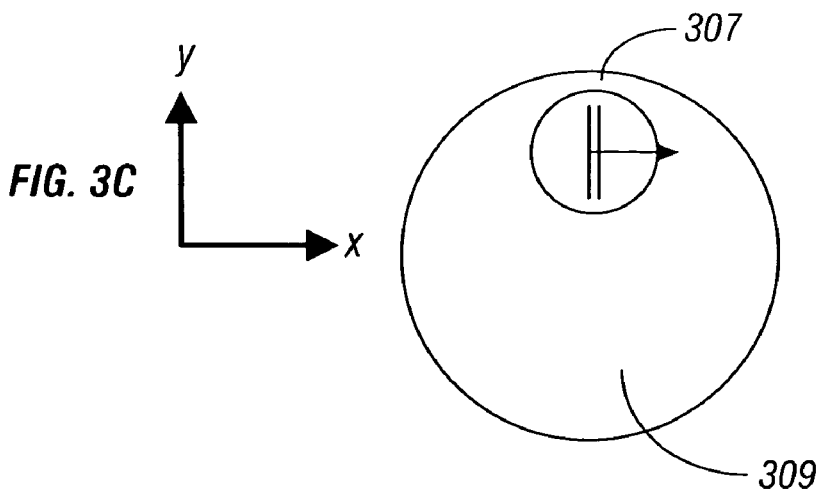

Table 1 shows simulation results for a measurement device eccentrically disposed within a borehole. The measurements are taken using the 3DEX™ multicomponent induction tool. The measurements are taken inside a mud-filled borehole having an 8-inch radius, the formation having a 17 ohm/m resistivity and the drilling mud having a resistivity of 0.2 ohm/m. Transmitter and receiver are oriented transverse to the tool axis and may be decentralized in a way similar to FIG. 3C. As can be seen in Table 1, when the original 3DEX™ is decentralized in the borehole, it experiences a distortion of 10 times the signal of a centered tool. Using the apparatus of the present disclosure, the distortion due to borehole eccentricity is reduced to 11% of the signal of the centered tool.

TABLE 1

| Tool | 3DEX ™ | Conductive shell |
|------|--------|------------------|
| Distortion | 10 times | 11% |

Table 2 shows simulation results for a measurement device having a misaligned transmitter and receiver coil with respect to the pipe. The measurements are taken using the 3DEX™ multi-component induction tool. The measurements are taken inside a mud-filled borehole having 8-inch (20.32 cm) diameter, the formation having a 100 Ω-m resistivity and the drilling mud having a resistivity of 0.1 Ω-m. Measurements are taken with aligned and misaligned coils. The misaligned transmitter and receiver coil are placed 1 mm off the center of the inner pipe. When aligned, the 3DEX™ records a conductivity of 10 mS/m, but with a 1 mm misalignment, the recorded conductivity is 8 mS/m. Using the apparatus of the present disclosure, the 1-mm misalignment causes a recorded conductivity of 40 mS/m.

TABLE 2

| Tool | 3DEX ™ | Conductive shell |
|------|--------|------------------|
| w/o misalignment | 10 mS/m | 10 mS/m |
| 1-mm | 8 mS/m | 40 mS/m |

The invention may also be implemented in conjunction with a measurement-while-drilling arrangement in which the multi-component and multi-array measurements are made using a suitable device on a bottomhole assembly conveyed on a drilling tubular such as a drillstring.

The measurements made by the logging tool may be used to determine a property of an earth formation. Methods of determination of such properties of the earth formation are discussed, for example, in U.S. Pat. No. 6,493,632 to Mollison et al., U.S. Pat. No. 6,470,274 to Mollison et al., and U.S. Pat. No. 6,686,736 to Schoen et al., having the same assignee as the present invention and the contents of which are incorporated herein by reference. Such properties include vertical and horizontal resistivities, sand fraction and water saturation. In addition, properties such as formation dip and azimuth may be determined using methods discussed in U.S. Pat. No. 6,643,589 to Zhang et al., having the same assignee as the present invention and the contents of which are incorporated herein by reference. The results of such analysis are output to a suitable medium and used for making decisions regarding reservoir development including well completion, running of other logs, and drilling of additional wells.

Implicit in the control and processing of the data is the use of a computer program on a suitable machine readable medium that enables the processors to perform the control and processing. The machine readable medium may include ROMs, EPROMs, EEPROMs, Flash Memories and Optical disks.

While the foregoing disclosure is directed to the preferred embodiments of the invention, various modifications will be apparent to those skilled in the art. It is intended that all variations within the scope of the appended claims be embraced by the foregoing disclosure.

What is claimed is:

1. An apparatus for evaluating an earth formation, the apparatus comprising:
   (a) a logging tool including a non-conducting member having a conductive outer sleeve provided with a plurality of openings;
   (b) at least one antenna associated with each of the plurality of openings, at least one of the antennas having a coil oriented at a non-zero angle to a longitudinal axis of the non-conducting member; and
   (c) a central conducting member including wires that electrically connect at least one of the plurality of antennas to another of the plurality of antennas.

2. The apparatus of claim 1 wherein the outer sleeve further comprises a plurality of electrically coupled shells.

3. The apparatus of claim 1 further comprising a processor configured to analyze data resulting from activation of at least one transmitter antenna with the logging tool in a borehole in the earth formation.

4. The apparatus of claim 3 wherein the data are substantially insensitive to an eccentering of the logging tool.

5. The apparatus of claim 3 wherein the data are substantially insensitive to a misalignment of the coil of the at least one antenna.

6. The apparatus of claim 1 further comprising a conveyance device configured to convey the logging tool into a borehole in the earth formation, the conveyance device selected from (i) a wireline, and (ii) a drilling tubular.

7. The apparatus of claim 3 wherein the processor is further configured to save a result of the analysis to a tangible medium.

8. The apparatus of claim 1 wherein the central conducting member is electrically insulated from the conductive outer sleeve.

9. A method of evaluating an earth formation, the method comprising:
   conveying a logging tool into a borehole in the earth formation;
   activating at least one antenna having a coil oriented at a non-zero angle to a longitudinal axis of the logging tool; and
   providing the logging tool with a non-conductive mandrel and a conducting sleeve and reducing an effect on a signal received by a receiver coil on the logging tool due to at least one of (A) an eccentering of the logging tool, and (B) a coil misalignment, when the logging tool includes a central conducting member including wires that electrically connect the at least one coil.

10. The method of claim 9 wherein reducing the effect further comprises using, as the conductive sleeve, a plurality of electrically coupled shells.

11. The method of claim 9 further comprising analyzing the signal to determine a property of the earth formation.

12. The method of claim 11 further comprising storing a result of the analysis on a tangible medium.

13. The method of claim 11 wherein the property is selected from (i) a vertical resistivity, (ii) a horizontal resistivity, (iii) a sand fraction, (iv) a water saturation, (v) a formation dip, and (vi) an azimuth.

14. The method of claim 9 further comprising conveying the logging tool into the borehole using one of (i) a wireline, and (ii) a drilling tubular.

15. A computer-readable medium accessible to a processor, the computer-readable medium including instructions which enable the processor to estimate a property of an earth formation selected from (i) a vertical resistivity, (ii) a horizontal resistivity, (iii) a sand fraction, (iv) a water saturation, (v) a formation dip, and (vi) an azimuth using measurements made by a logging tool including:
  (a) including a non-conducting member having a conductive outer sleeve provided with a plurality of openings;
  (b) at least one antenna associated with each of the plurality of openings, at least one of the antennas having a coil oriented at a non-zero angle to a longitudinal axis of the non-conducting member; and
  (c) a central conducting member including wires that electrically connect at least one of the plurality of antennas to another of the plurality of antennas.

16. The medium of claim 15 further comprising at least one of (i) a ROM, (ii) an EPROM, (iii) an LEPROM, (iv) a flash memory, and (v) an optical disk.

* * * * *

UNITED STATES PATENT AND TRADEMARK OFFICE
CERTIFICATE OF CORRECTION

PATENT NO. : 7,554,328 B2
APPLICATION NO. : 11/598305
DATED : June 30, 2009
INVENTOR(S) : Tsili Wang and Alexandre N. Bespalov Page 1 of 1

It is certified that error appears in the above-identified patent and that said Letters Patent is hereby corrected as shown below:

Column 9, line 3, delete "including".

Signed and Sealed this

Twenty-fifth Day of August, 2009

David J. Kappos
*Director of the United States Patent and Trademark Office*